(12) United States Patent
Kugler et al.

(10) Patent No.: US 7,924,290 B2
(45) Date of Patent: Apr. 12, 2011

(54) METHOD AND SYSTEM FOR PROCESSING TEXTURE SAMPLES WITH PROGRAMMABLE OFFSET POSITIONS

(75) Inventors: Anders M. Kugler, Sunnyvale, CA (US); Alexander L. Minkin, Los Altos, CA (US); William P. Newhall, Jr., San Francisco, CA (US); Christopher J. Migdal, Cupertino, CA (US); Pemith R. Fernando, Santa Clara, CA (US); Lup-Yen Peter Young, San Jose, CA (US); Mehmet Cem Cebenoyan, Palo Alto, CA (US); Yury Y. Uralsky, Moscow (RU)

(73) Assignee: NVIDIA Corporation, Santa Clara, CA (US)

(*) Notice: Subject to any disclaimer, the term of this patent is extended or adjusted under 35 U.S.C. 154(b) by 986 days.

(21) Appl. No.: 11/755,531

(22) Filed: May 30, 2007

(65) Prior Publication Data

US 2008/0297528 A1 Dec. 4, 2008

(51) Int. Cl.
*G06T 17/00* (2006.01)
*G06T 11/40* (2006.01)
*G09G 5/00* (2006.01)
*G09G 5/02* (2006.01)
*G06K 9/40* (2006.01)
*G06K 9/36* (2006.01)
*G06K 9/32* (2006.01)

(52) U.S. Cl. ........ 345/582; 345/428; 345/606; 345/619; 345/552; 382/254; 382/260; 382/285; 382/300

(58) Field of Classification Search ................. 345/418, 345/421, 428, 581–587, 611–617, 552, 619, 345/606, 422; 382/254, 260, 269, 274, 276, 382/285, 300, 305
See application file for complete search history.

(56) References Cited

U.S. PATENT DOCUMENTS

2008/0122856 A1* 5/2008 Boyd et al. .................... 345/582

OTHER PUBLICATIONS

Translated Office Action, Chinese Pat. App. No. 200810111006.0, dated Jun. 1, 2010. (Provided as explanation of relevance of DONG).

* cited by examiner

*Primary Examiner* — Sajous Wesner
(74) *Attorney, Agent, or Firm* — Patterson & Sheridan, LLP (57) ABSTRACT

A method and system for performing a texture operation with user-specified offset positions are disclosed. Specifically, one embodiment of the present invention sets forth a method, which includes the steps of deriving a first destined texel position based on an original sample position associated with a pixel projected in a texture map and a first offset position specified by a user and fetching texel attributes at the first destined texel position for the texture operation.

20 Claims, 8 Drawing Sheets

METHOD AND SYSTEM FOR PROCESSING TEXTURE SAMPLES WITH PROGRAMMABLE OFFSET POSITIONS

BACKGROUND OF THE INVENTION

1. Field of the Invention

The present invention generally relates to computer graphics and more particularly to a method and system for processing texture samples with programmable offset positions.

2. Description of the Related Art

Unless otherwise indicated herein, the approaches described in this section are not prior art to the claims in this application and are not admitted to be prior art by inclusion in this section.

Figure 1A:
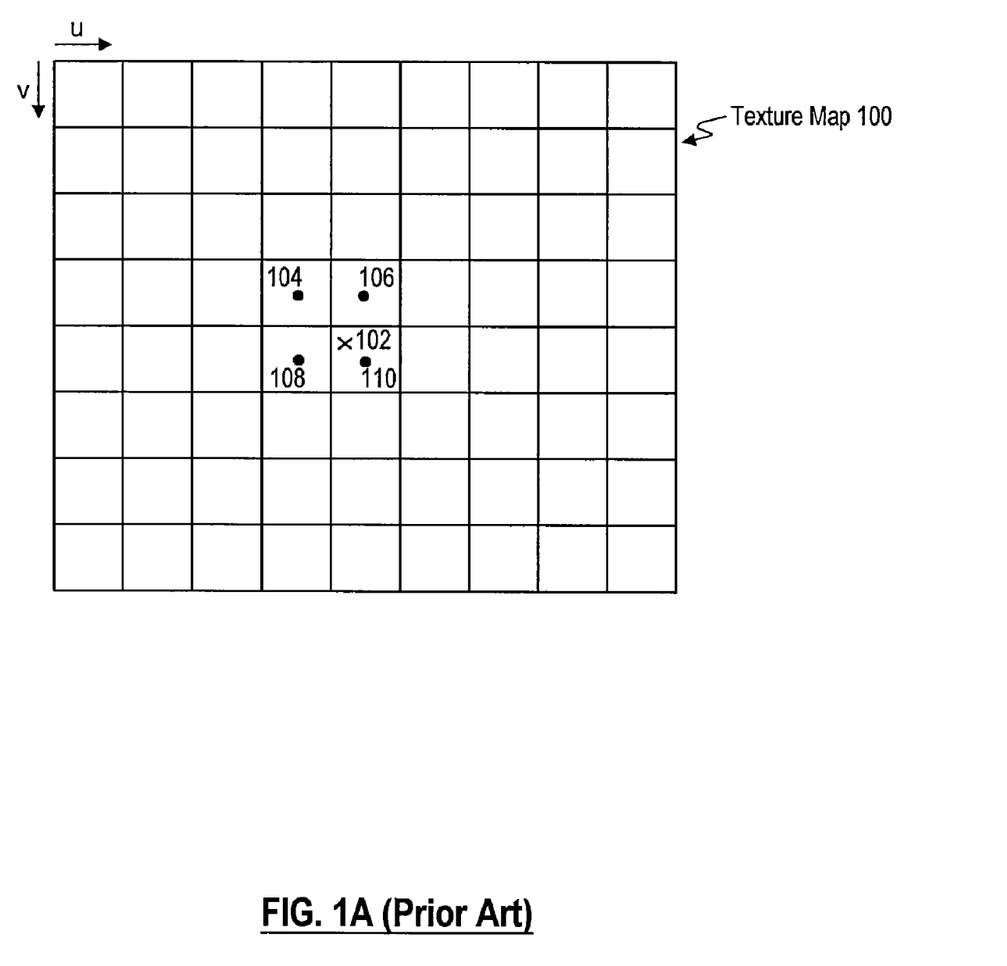
FIG. 1A is a texture map in which a prior art 2 by 2 filter kernel accesses four adjacent texels surrounding a pixel center in a single clock cycle and then applies bilinear filtering to the texels.

A common texture filtering approach to address aliasing artifacts involves accessing and filtering an equal number of texels along different axes that surround a pixel center mapped into texture space. Such an approach typically employs a bilinear filter or a trilinear filter. As an illustration, FIG. 1A is a texture map 100 in which a prior art 2 by 2 filter kernel accesses four adjacent texels 104, 106, 108, and 110 surrounding a pixel center 102 in a single clock cycle and then bilinear filtering the texels.

However, some texturing applications filter texels differently. One example is texture based shadow mapping, and another is highly dynamic range (HDR) rendering. Shadow mapping is a shadow rendering technique to enhance realism in computer-generated scenes. More specifically, during a shadow mapping process, a scene is first rendered from a light's point of view to generate a special texture map, commonly referred to as a shadow map, in which each texel in the shadow map stores a depth value associated with a visible surface. Then, the view of the scene is rendered from an observer's point view, by which a pixel at a (x, y) location in the screen space is projected into the light-space coordinates and then tested for visibility. This test compares the depth value of the pixel with the depth value stored at the corresponding location in the depth map to determine whether the pixel is behind an object. Based on the comparison result, the pixel is either drawn in shadow or lighted. To render smooth shadows pleasant to the eye, more than four texels from the shadow map may need to be sampled per pixel, and these texels often are not adjacent to one another.

As for the HDR rendering technique, it is a technique for preserving detail in a scene with significant contrast differences. In other words, if there are both dark and bright areas in a scene, both of the areas can be accurately represented using this technique. Similar to the shadow mapping technique described above, the HDR rendering technique also may sample more than four texels per pixel. These texels are usually distributed more sparsely than the 2 by 2 region, such as texels 124, 126, 128, and 130 shown in FIG. 1B.

Figure 1B:
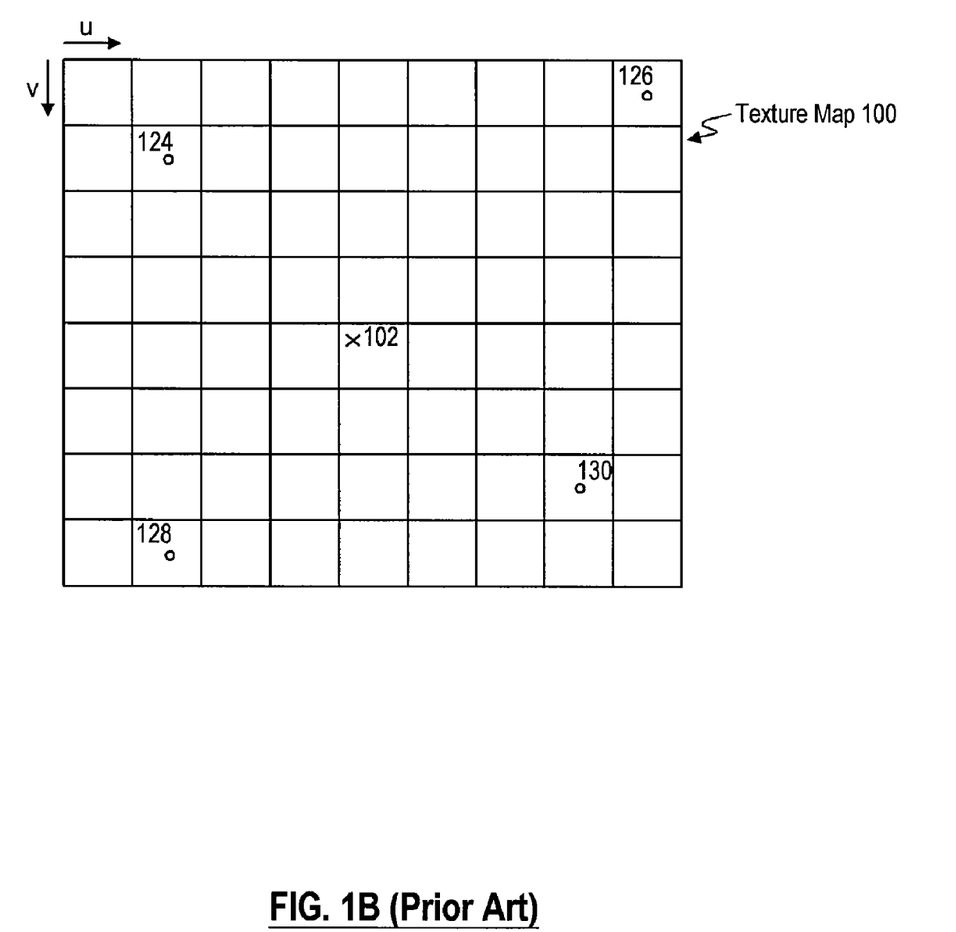
FIG. 1B is a texture map illustrating sparsely distributed texels that are needed in a texture operation.

Employing the prior art 2 by 2 filter kernel in the aforementioned shadow mapping and HDR rendering operations has several drawbacks. First, the 2 by 2 filter kernel is likely only able to access one of the sparsely distributed texels per clock cycle. So, to access all the desired texels, multiple clock cycles are needed. To illustrate, suppose a texturing application needs to access texels 124, 126, 128, and 130, and the prior art 2 by 2 filter kernel is used. Because the size of the 2 by 2 filter kernel is not large enough to cover all four desired texels at the same time but can cover one of the four texels, such as texel 124, three quarters of the available texture access bandwidth for the filter kernel is not used. For a texturing application needing to access more than four texels per pixel (e.g., sixteen texels), the inefficiency of the 2 by 2 filter kernel will be even more evident. Second, the prior art 2 by 2 filter kernel bilinearly weigh the sampled texels, which may not be optimal for certain texturing applications, such as the ones involving the shadow mapping and HDR rendering operations discussed above.

As the foregoing illustrates, what is needed in the art is thus a texture filtering technique that can efficiently and flexibly sample specified texels and address at least the problems set forth above.

SUMMARY OF THE INVENTION

A method and system for performing a texture operation with user-specified offset positions are disclosed. Specifically, one embodiment of the present invention sets forth a method, which includes the steps of deriving a first destined texel position based on an original sample position associated with a pixel projected in a texture map and a first offset position specified by a user and fetching texel attributes at the first destined texel position for the texture operation.

At least one advantage of the invention disclosed herein is the ability to operate on texture samples at locations determined by a user-specified offset position, so that texture operations can be flexibly implemented and efficiently carried out.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this disclosure, the term "user" broadly refers to a user or a developer of software program executing on a computing device. In addition, the terms "user-specified" and "programmable" can be used interchangeably to qualify a texture sample position or a texture sample offset position that can be specified or modified by a user. A texture sample is commonly referred to as a texel. Also, some examples of a "computer-readable medium" referred to herein include, without limitation, non-volatile media (e.g., optical or magnetic disks) and volatile media (e.g., dynamic memory).

Figure 2A:
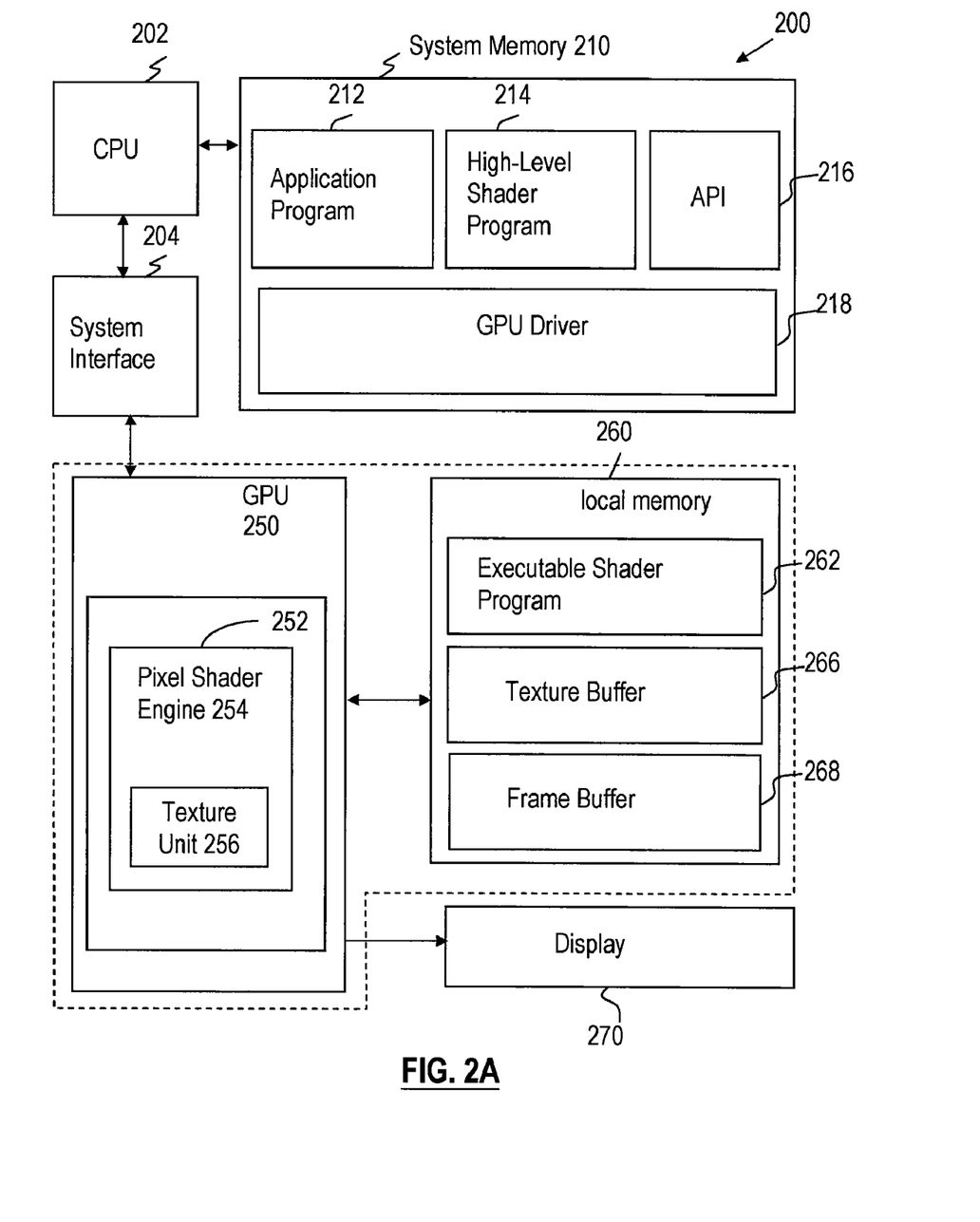
FIG. 2A is a conceptual diagram of a computing device configured to implement one or more aspects of the present invention.

FIG. 2A is a conceptual diagram of a computing device 200 configured to implement one or more aspects of the present invention. Computing device 200 includes a central processing unit (CPU) 202, a system interface 204, a system memory 210, a graphics processing unit (GPU) 250, a GPU local memory 260, and a display 270. CPU 202 connects to system memory 210 and system interface 204. The CPU 202 executes programming instructions stored in system memory 210, operates on data stored in system memory 210, and communicates with GPU 250 through the system interface 204. In alternate embodiments, CPU 202, GPU 250, system interface 204, or any combination thereof, may be integrated into a single processing unit. Further, the functionality of GPU 250 may be included in a chipset or in some other type of special purpose processing unit or co-processor. System memory 210 typically includes dynamic random access memory (DRAM) configured to either connect directly to CPU 202 (as shown) or alternately, via system interface 204. GPU 250 receives instructions transmitted by CPU 202 and processes the instructions in order to render graphics data and images stored in GPU local memory 260 on display 270. Display 270 is an output device capable of emitting a visual image corresponding to an input data signal.

System memory 210 contains an application program 212, a high-level shader programs 214, an application programming interface (API) 216, and a GPU driver 218. Application program 212 may invoke one or more instances of high-level shader program 214. The high-level shader programs typically include source code text of high-level programming instructions that are designed to operate on one or more processing engines within GPU 250. High-level shader programs 214 may be translated into executable program objects, such as executable shader programs 262, by a compiler or assembler included in GPU driver 218 or alternatively by an offline compiler or assembler operating either on computer device 200 or other computer devices.

Executable shader program 262, a texture buffer 266, and a frame buffer 268 all reside in GPU local memory 260. Executable shader program 262, when executed by pixel shader engine 254 in GPU 250, issues instructions to different components of rendering pipeline 252. Texture buffer 266 typically stores texture maps, including shadow maps. Frame buffer 268 includes at least one two-dimensional surface that is used to drive display 270.

Rendering pipeline 252 includes a pixel shader engine 254, which further includes a texture unit 256. Texture unit 256 is capable of retrieving requested texel attributes with programmable offset positions from texture buffer 266, processing filter weights, and performing depth comparison operations and texture filtering operations. Subsequent paragraphs will further detail the functions and operations of texture unit 256.

Figure 2B:
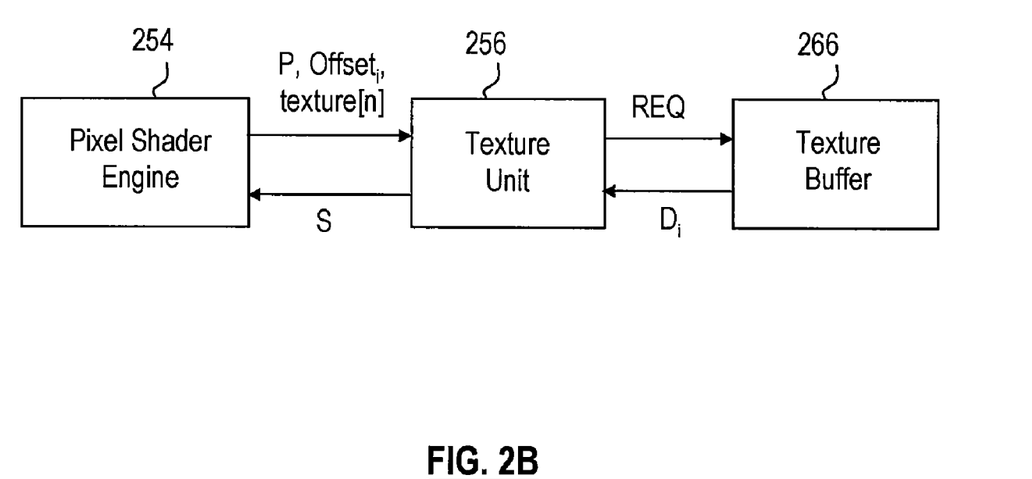
FIG. 2B is a schematic diagram of a portion of GPU 250 shown in FIG. 2A that carries out a texture filtering operation with programmable offset positions, according to one embodiment of the present invention.

FIG. 2B is a schematic diagram of a portion of GPU 250 shown in FIG. 2A that carries out a texture filtering operation with programmable offset positions, according to one embodiment of the present invention. To illustrate, suppose the texture filtering operation is to generate a shadow state value S for a screen pixel P shown in FIG. 2C. In one implementation, a shader program instruction issued to texture unit 256 includes an output argument S and multiple input arguments, such as P, $Offset_i$, and texture[n]. Here, S represents the placeholder for the computed shadow result. P represents the texture coordinates of a screen pixel projected in a shadow map 280. $Offset_i$ refers to a programmable $(u_i, v_i)$ pair in shadow map 280. Texture[n] corresponds to a particular shadow map stored in texture buffer 266, such as shadow map 280.

Figure 2C:
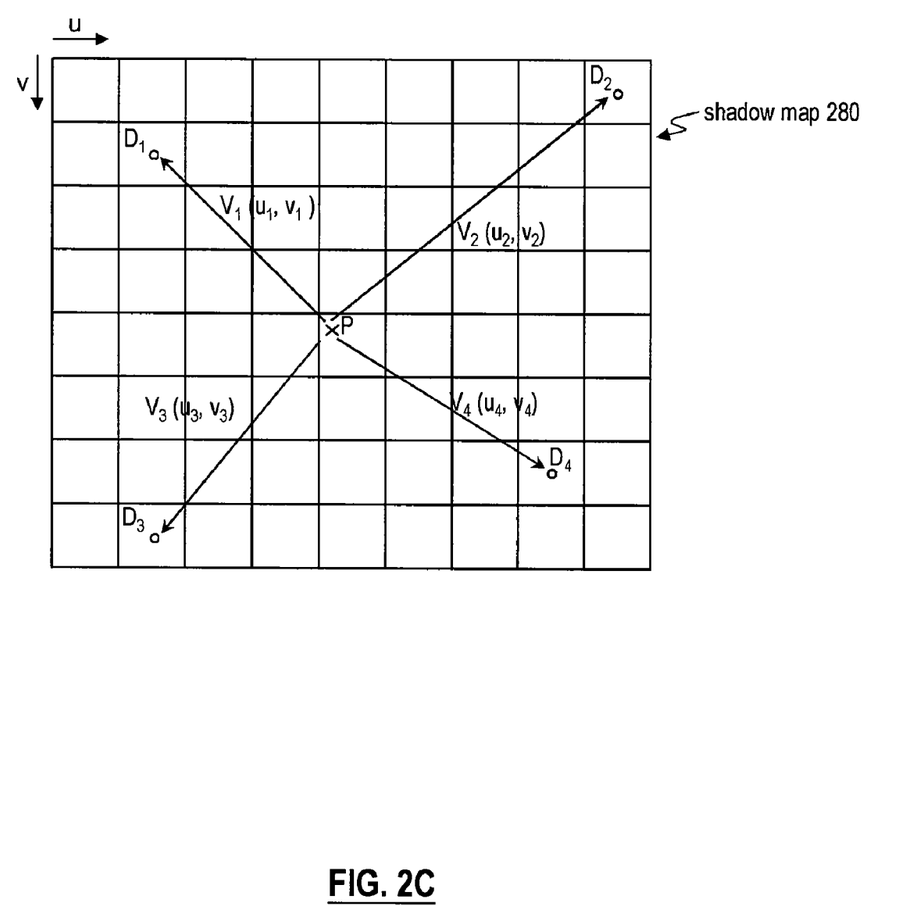
FIG. 2C is a portion of a texture map illustrating a texture operation with programmable offset positions, according to one embodiment of the present invention.

With P, S, $Offset_i$, and texture[n] as inputs, texture unit 256 derives destined texel positions $D_1$, $D_2$, $D_3$, and $D_4$ by applying the $Offset_i$ to P. For example, if P is represented by $(u_0, v_0)$, and $Offset_1$ is represented by $(u_{offset}, v_{offset})$, then D1 is then $(u_0+u_{offset}, v_0+v_{offset})$ or $(u_1, v_1)$. In addition, as shown in FIG. 2C, with the origin at P, each pair of $(u_i, v_i)$ is also associated with a vector, $V_i$. For instance, $V_1$ is associated with the origin at P and $Offset_1$. Furthermore, in this implementation, four different (u, v) pairs are specified by a user and are not required to be symmetrical to one another. Specifically, the length of $u_1$ in $Offset_1$ is not required to be identical to any of the length of u or v in $Offset_2$, $Offset_3$, and $Offset_4$. Similarly, the length of $v_1$ in $Offset_1$ is also not required to be identical to any of the length of v or u in $Offset_2$, $Offset_3$, and $Offset_4$. Thus, the size and the shape of the filter kernel covering these destined texel positions can be arbitrary. It should be apparent to a person with ordinary skills in the art to scale to N samples with N offset pairs without exceeding the scope of the present invention.

Figure 2D:
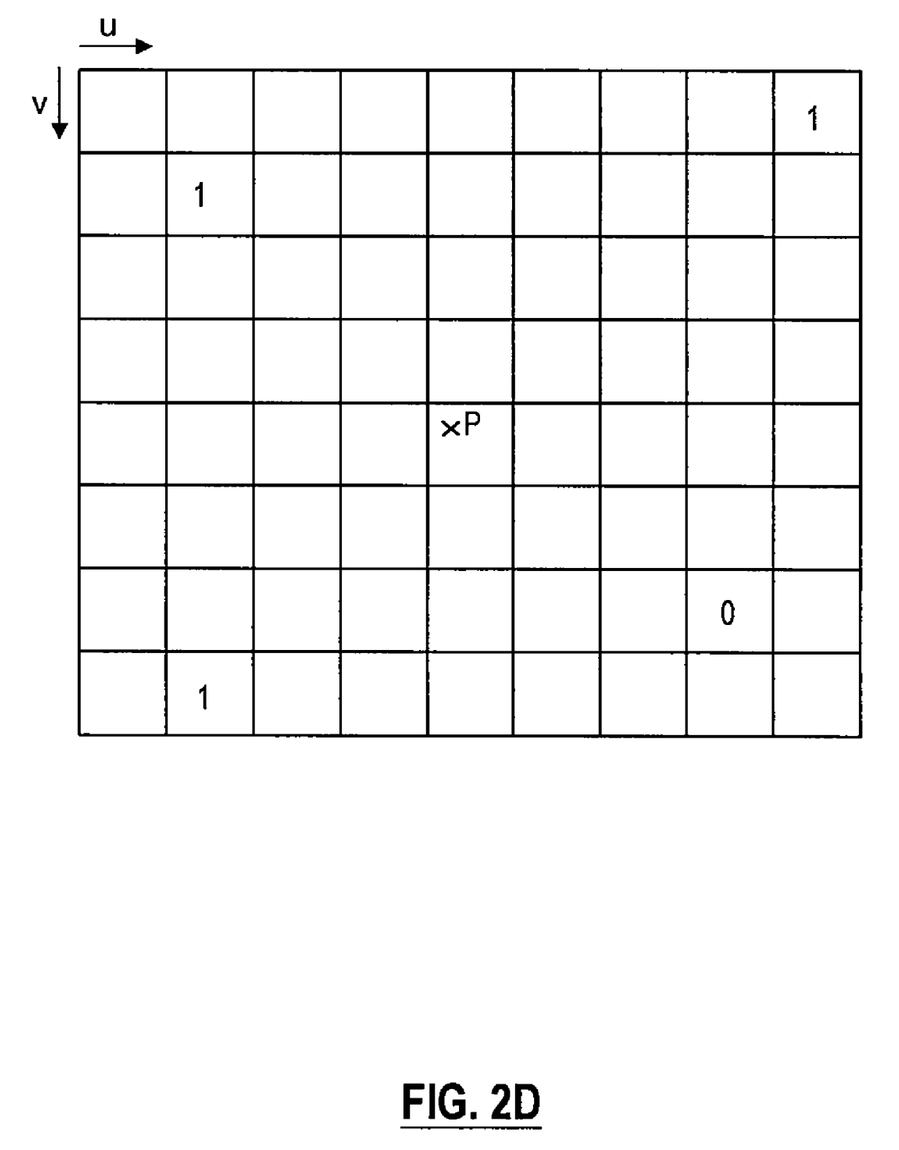
FIG. 2D is a conceptual drawing illustrating one set of results from applying the depth map test to some texels at the destined texel positions, according to one embodiment of the present invention.

With the destined texel positions, texture unit 256 sends a read request to texture buffer 266 to fetch appropriate texel attributes at $D_1$, $D_2$, $D_3$ and $D_4$, such as the depth values. Then, each of the depth values is compared against the depth value associated with P in a depth map test. FIG. 2D is a conceptual drawing illustrating one set of results from applying the depth map test to texels $D_1$, $D_2$, $D_3$ and $D_4$. Whether the depth value associated with P is greater or smaller than the depth values stored at $D_1$, $D_2$, $D_3$, and $D_4$ is represented by either 1 or 0. To derive the final shadow state value S, texture unit 256 applies filter weights to the results of the depth map test. In one embodiment, texture unit 256 calculates the shadow state value by simply averaging the results of the depth map test to blur aliasing effects. Here, because there are four samples, each of the four filter weights equals to ¼. Alternatively, texture unit 256 can also apply filter weights that are based on the relative distance between the sampled texels and the projected pixel, such as in the conventional bilinear filter. Texture unit 256 returns the final shadow state value S to pixel shader engine 254.

Figure 2E:
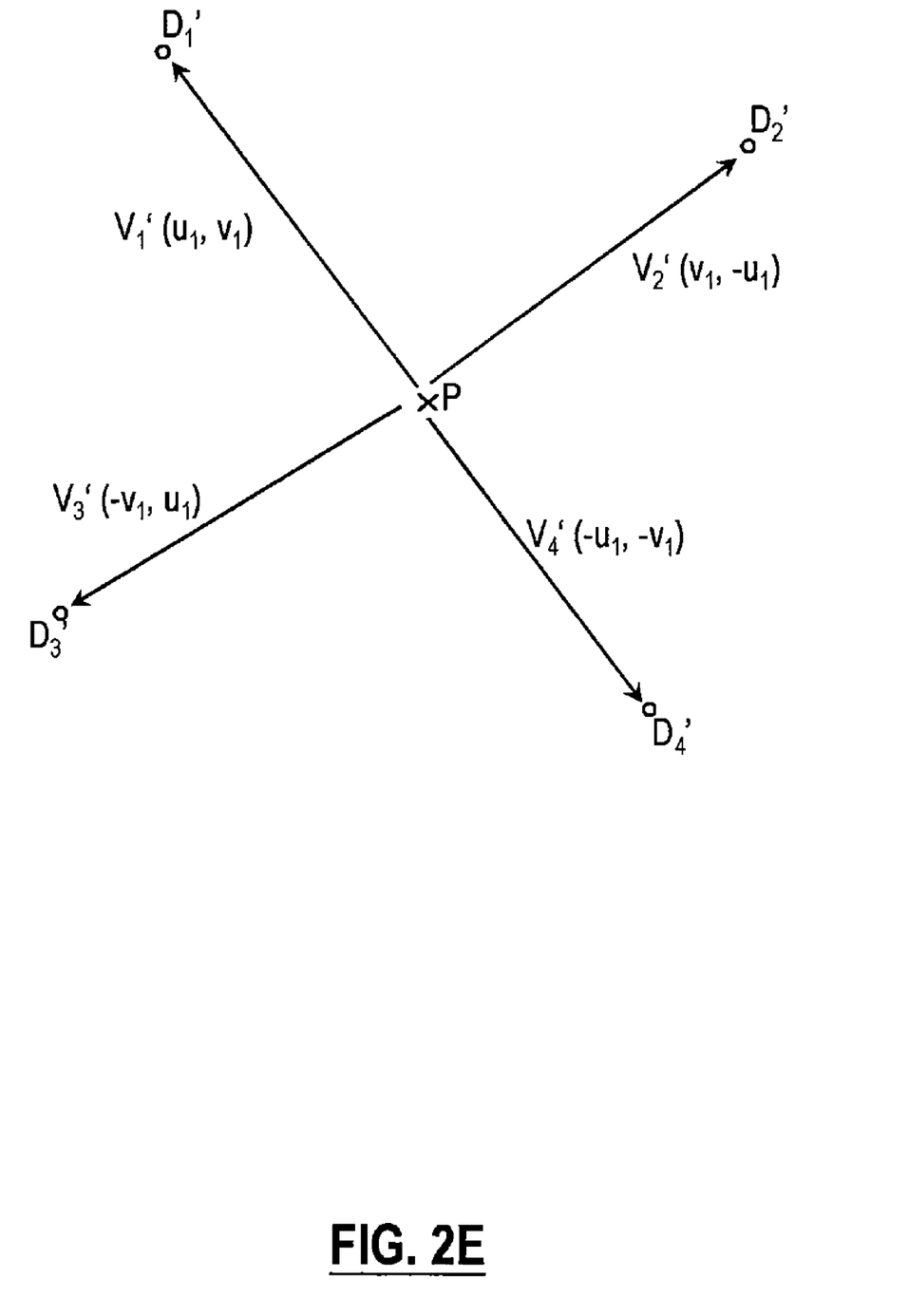
FIG. 2E is a conceptual diagram illustrating the derivation of texel positions from a single user-specified offset position, according to one embodiment of the present invention.

While the foregoing embodiment describes one implementation in which the position of each sampled texel is derived from a user-specified offset position, the present invention contemplates other possible ways to derive destined texel positions. According to an alternative embodiment of the present invention, FIG. 2E is a conceptual diagram illustrating the derivation of texel positions from a single user-specified offset position. In particular, instead of receiving four user-specified (u, v) pairs as the aforementioned embodiment, texture unit 256 here receives a single $Offset_1$, such as $(u_1, v_1)$. Then texture unit 256 symmetrically transforms the $(u_1, v_1)$ pair to generate the other three offsets without further user intervention. In one implementation, $Offset_2$, $Offset_3$, and $Offset_4$ are $(v_1, -u_1)$, $(-v_1, u_1)$, and $(-u_1, -v_1)$, respectively. For example, if $(u_1, v_1)$ has the values of (3, 1), then $Offset_2$, $Offset_3$, and $Offset_4$ have the values of (1, -3), (-1, 3), and (-3, -1), respectively. With these $Offset_1$, $Offset_2$, $Offset_3$, and $Offset_4$ and the original sample position of the projected screen pixel P, the destined texel positions $D_1'$, $D_2'$, $D_3'$ and $D_4'$ are calculated. It is worth noting that unlike the implementation shown in FIG. 2C and discussed above, the symmetrical transformations employed in this implementation automatically generate destined texel positions that mirror one another, and the size and shape of the filter kernel covering these mirroring texels cannot be as arbitrary.

According to yet another embodiment of the present invention, texture unit 256 applies a user-specified scale factor α to all the Offsets. Suppose α is 3. Referring back to the example discussed above, the scaled $Offset_1$, $Offset_2$, $Offset_3$, and $Offset_4$ become (9, 3), (3, −9), (−3, 9), and (−9, −3), respectively. With the scale factor, the size of the filter kernel covering the destined texel positions can be modified easily.

Instead of specifying only a single (u, v) pair and relying on texture unit 256 to generate the other three Offsets, according to another embodiment of the present invention, texture unit 256 receives two user-specified and non-mirroring (u, v) pairs and generates the other two pairs without further user intervention. For example, referring back to FIG. 2E, suppose texture unit 256 receives $(u_1, v_1)$ and $(-v_1, u_1)$. In this implementation, texture unit 256 symmetrically mirrors the received (u, v) pairs to generate $(-u_1, -v_1)$ and $(v_1, -u_1)$, respectively.

To trigger texture unit 256 to perform any of the aforementioned operations, one approach is to issue specific shader program instructions with certain input arguments to texture unit 256. This class of shader program instructions is referred to as "programmable texel position (PTP) instructions." One of the input arguments for the PTP instructions can be a user-specified offset position or an array of user-specified offset positions. Alternatively, one of the input arguments triggers texture unit 256 to look up one or more offset positions specified and stored in a table by a user. According to one embodiment of the present invention, some examples of the PTP instructions, without limitation, include:

Sample_ptp
Sample_ptp2
Sample_ptp4
Sample_c_ptp
Sample_c_ptp2
Sample_c_ptp4
Load4_ptp
Load4_ptp2
Load4_ptp4
Load4_c_ptp
Load4_c_ptp2
Load4_c_ptp4

Executing any of the PTP instructions above triggers texture unit 256 to access a number of texels associated with a projected pixel at certain offset positions. The suffix "ptp" here means that only one programmable offset position is specified for one pixel in the instruction. In response to such an instruction with the "ptp" suffix, texture unit 256 generates the other three offset positions based on the single user-specified offset position. The suffix "ptp2" means that two programmable offset positions are specified in the instruction. In response to an instruction with the "ptp2" suffix, texture unit 256 generates the other two offset positions mirroring the two user-specified offset positions. Lastly, the suffix "ptp4" is used to indicate that four programmable offset positions are defined in the instruction. The preceding paragraphs detail some implementations of deriving offset positions from the user-specified offset position(s).

Figure 3:
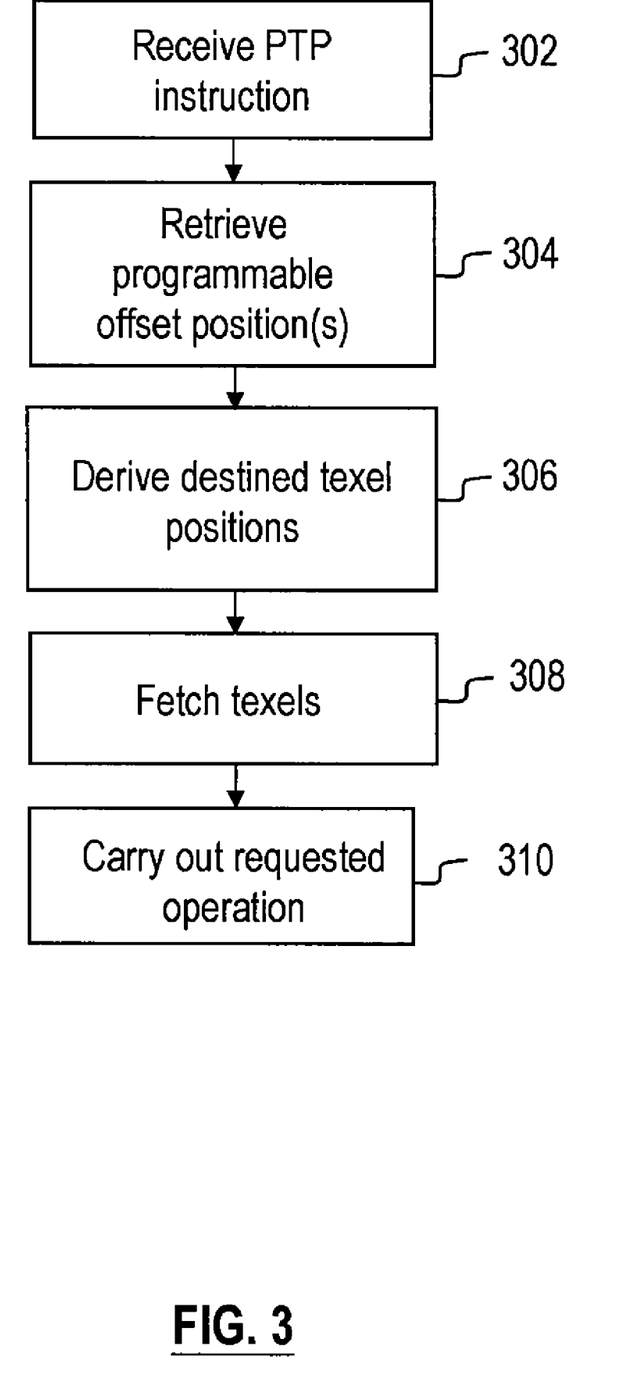
FIG. 3 is a flowchart of method steps for executing a texture operation with programmable offset positions in a texture unit, according to one embodiment of the present invention.

FIG. 3 is a flowchart of method steps for executing a PTP instruction in texture unit 256 involving programmable offset positions, according to one embodiment of the present invention. More specifically, in conjunction with pixel shader engine 254 and texture unit 256 shown in FIG. 2A, as pixel shader engine 254 executes executable shader program 262, a PTP instruction with at least one user-specified offset position may be issued to texture unit 256. To illustrate, suppose the issued PTP instruction has the suffix of "ptp4" and contains four (u, v) pairs. In step 302, texture unit 256 receives the instruction and recognizes from the suffix of the instruction that there are multiple (u, v) pairs. In step 304, texture unit 256 retrieves the four pairs of user-specified offset positions and then derives the destined texel positions in step 306. On the other hand, if the issued PTP instruction has the suffix of "ptp" instead, then texture unit 256 still retrieves the single user-specified offset position in step 304 and performs the symmetrical transformation detailed above to derive the other three destined texel positions in step 306.

Once the destined texel positions are determined, texture unit 256 fetches the relevant texel attributes, such as the depth values, from the texture map specified in the PTP instruction in step 308. In step 310, depending on the type and the contents of the issued PTP instruction, texture unit 256 performs the requested operation by the instruction. For example, if the PTP instruction is Sample_[ptp/ptp2/ptp4], then the fetched texel attributes are filtered and a unique texel is generated per pixel. If the PTP instruction is Sample_c_[ptp/ptp2/ptp4], then depth-comparison is performed on the fetched texel attributes, and the results are filtered to generate a unique texel per pixel. If the PTP instruction is Load4_[ptp/ptp2/ptp4], then the fetched texel attributes are returned per pixel. Neither the depth-comparison operation nor the filtering operation is performed. If the PTP instruction is Load4_c_[ptp/ptp2/ptp4], then depth-comparison is performed on the fetched texel attributes, and the results are returned per pixel. No filtering operation is performed.

In one implementation, this new class of PTP instructions is a part of API 216 shown in FIG. 2A, so that they can be invoked by any application program developed using API 216 and can be hardware-plafform independent. Also, these instructions in conjunction with texture unit 256 enable a developer to efficiently implement sampling methods that result in filter kernels with large sizes and dynamically generated shapes, such as the stochastic sampling technique. Furthermore, in addition to bilinear filtering and equal averaging filtering as discussed above, it should be apparent to a person with ordinary skills in the art to use the programmable offset positions in other filtering schemes, such as anisotropic filtering and isotropic filtering. For example, if an anisotropic filtering operation requires looking up and filtering sixteen samples, then in one implementation, one of the PTP instructions is issued four times so that sixteen offset positions are applied to all sixteen samples.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A computer-implemented method for performing a texture operation, comprising:
    deriving, by a processing unit, a first destined texel position based on an original sample position associated with a pixel projected in a texture map and a first offset position specified by a user, wherein the first destined texel position is also associated with a first vector that originates at the original sample position and points in a different direction compared with a second vector that also originates at the original sample position and is associated with a second destined texel position; and fetching, from a memory that stores the texture map, texel attributes at the first destined texel position for the texture operation.

2. The method of claim 1, wherein a first destined texel at the first destined texel position is one of four bilinear samples that are associated with and located adjacent to the pixel in the texture map.

3. The method of claim 1, further comprising:
deriving a second offset position for a second destined texel from the first offset position;
deriving the second destined texel position for the second destined texel based on the original sample position and the second offset position; and
fetching texel attributes at the second destined texel position for the texture operation.

4. The method of claim 3, wherein the second destined texel position is symmetrical to the first destined texel position along at least one axes of the texture map.

5. The method of claim 4, further comprising applying a scale factor specified by the user to the first offset position and the second offset position.

6. The method of claim 3, further comprising:
setting a coordinate value along a first axes of the texture map for the second offset position to equal to a coordinate value along a second axes of the texture map for the first offset position.

7. The method of claim 1, further comprising:
deriving the second destined texel position for a second destined texel based on the original sample position and a second offset position specified by a user; and
fetching texel attributes at the second destined texel position for the texture operation.

8. The method of claim 2, wherein the texture operation includes applying filter weights to the four bilinear samples to generate a unique value for the pixel.

9. The method of claim 8, wherein the filter weights can have arbitrary values.

10. The method of claim 1, wherein the texture operation includes performing a depth comparison between the pixel and the fetched texel attributes.

11. The method of claim 10, wherein the texture operation includes applying a filtering operation on the result of a depth comparison operation.

12. A computing device configured to perform a texture operation, the computing device comprising:
a processing unit with a texture unit; and
a local memory coupled to the processing unit containing a texture map, wherein the texture unit is configured to:
derive a first destined texel position based on an original sample position associated with a pixel projected in a texture map and a first offset position specified by a user, wherein the first destined texel position is also associated with a first vector that originates at the original sample position and points in a different direction compared with a second vector that also originates at the original sample position and is associated with a second destined texel position; and
fetch texel attributes at the first destined texel position for the texture operation.

13. The computing device of claim 12, wherein a first destined texel at the first destined texel position is one of four bilinear samples that are associated with and located adjacent to the pixel in the texture map.

14. The computing device of claim 12, wherein the texture unit is further configured to:
derive a second offset position for a second destined texel from the first offset position;
derive the second destined texel position for the second destined texel based on the original sample position and the second offset position; and
fetch texel attributes at the second destined texel position for the texture operation.

15. The computing device of claim 14, wherein the second destined texel position is symmetrical to the first destined texel position along at least one axes of the texture map.

16. The computing device of claim 15, wherein a scale factor specified by the user is applied to the first offset position and the second offset position.

17. The computing device of claim 14, wherein the texture unit is further configured to set a coordinate value along a first axes of the texture map for the second offset position to equal to a coordinate value along a second axes of the texture map for the first offset position.

18. The computing device of claim 13, wherein the texture unit is further configured to:
derive the second destined texel position for a second destined texel based on the original sample position and a second offset position specified by a user; and
fetch texel attributes at the second destined texel position for the texture operation.

19. The computing device of claim 13, wherein the texture unit is further configured to apply equal filter weights to the four bilinear samples to generate a unique value for the pixel in the texture operation.

20. The computing device of claim 12, wherein the texture unit is further configured to perform a depth comparison between the pixel and the fetched texel attributes in the texture operation.

* * * * *